United States Patent [19]
Murray et al.

[11] 3,919,939
[45] Nov. 18, 1975

[54] METHOD AND MEANS FOR FLASH SUPPRESSION

[75] Inventors: James L. Murray; Lawrence M. Sires, both of China Lake, Calif.

[73] Assignee: The United States of America as represented by the Secretary of the Navy, Washington, D.C.

[22] Filed: Nov. 1, 1974

[21] Appl. No.: 519,960

[52] U.S. Cl. ............... 102/7.2; 102/24 HC; 89/1 B; 244/137 R
[51] Int. Cl.² ......................................... F42B 25/16
[58] Field of Search ................. 244/137 R, 122 AF; 102/49.5, 24 R, 24 HC, 7.2, 2; 89/1 B

[56] References Cited
UNITED STATES PATENTS

| | | | |
|---|---|---|---|
| 2,310,343 | 2/1943 | Barab | 102/24 R |
| 2,869,825 | 1/1959 | Crawford | 102/24 HC |
| 3,107,641 | 10/1963 | Haynes | 102/24 HC |
| 3,165,057 | 1/1965 | Armstrong | 102/24 HC |
| 3,248,072 | 4/1966 | Schimmel | 102/24 HC |
| 3,721,192 | 3/1973 | McEwan | 102/24 HC |
| 3,752,078 | 8/1973 | Stump | 102/49.5 |

Primary Examiner—Trygve M. Blix
Assistant Examiner—Galen L. Barefoot
Attorney, Agent, or Firm—R. S. Sciascia; Roy Miller; Gerald F. Baker

[57] ABSTRACT

A method and apparatus is provided for suppressing light flashes from a linear-shaped charge, for example, on a cargo dispenser. Undesirable light flashes may be suppressed by either manufacturing the linear shaped charge container from silver or placing a container of chemical suppressant along the external skin of the cargo section at the cutting line of the linear shaped charge or both.

6 Claims, 5 Drawing Figures

METHOD AND MEANS FOR FLASH SUPPRESSION

CROSS REFERENCE TO RELATED APPLICATION

An aerial delivery cargo dispenser of the type referred to in this application is disclosed and claimed in assignee's prior U.S. Pat. No. 3,752,078 issued Aug. the 14th, 1973 and the same is hereby incorporated by reference.

BACKGROUND OF THE INVENTION

During night missions, observers on the ground have noted undesirable light flashes emitted from aerial delivery cargo dispensers which could allow alert gun crews to estimate the aircraft flight path and to anticipate aircraft positions with respect to time. Other nighttime tests indicate that some linear shaped charge opening mechanisms generate a flash capable of illuminating the attack aircraft during most normal delivery maneuvers. Under combat conditions, a single aircraft illumination may be sufficient to disclose both position and flight path to alert enemy observers.

The present invention relates to means for minimizing the illuminating quality of the linear shaped charge mechanisms now used to cut open an aerial delivery cargo dispenser, for example, as disclosed in assignee's prior U.S. Pat. No. 3,752,078. Significant light suppression has been accomplished in one instance by modifying the linear shaped charge device itself and in another by the addition of a chemical along the cargo section skin directly opposite the linear shaped charge. A combination of the two is contemplated.

DESCRIPTION AND OPERATION

Figure 1:
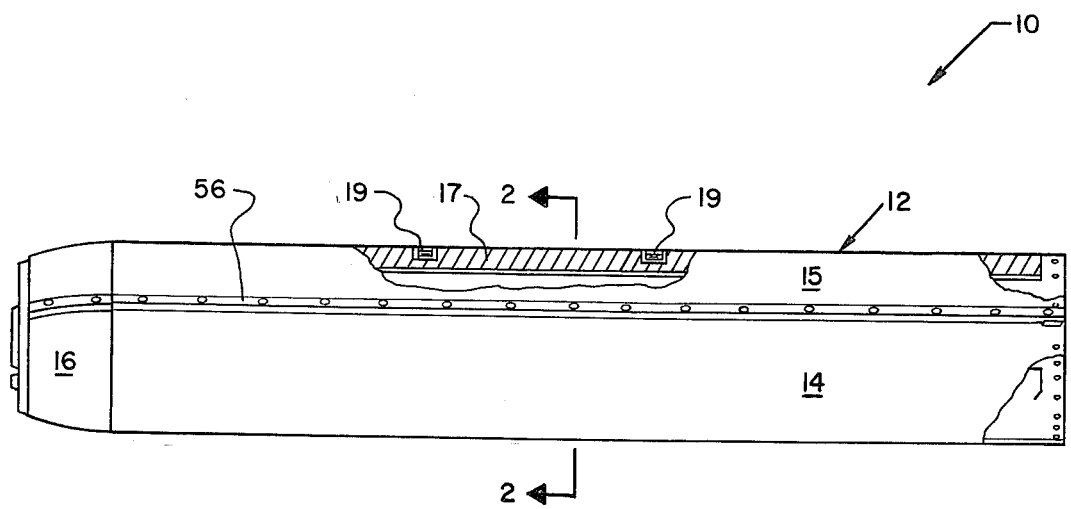
FIG. 1 is a side elevational view of a cargo dispenser section with portions broken away for clarity.

The dispenser 10 shown in FIG. 1 comprises a central cargo section 12 manufactured by welding together three main components; an upper section 15, a lower section 14 and a forward bulkhead portion 16. The sections 14 and 15, which are preferably of lightweight aluminum, are designed to be extruded for maximum strength at minimum cost. The semi-ogival section 16, however is more advantageously manufactured by casting.

Figure 2:
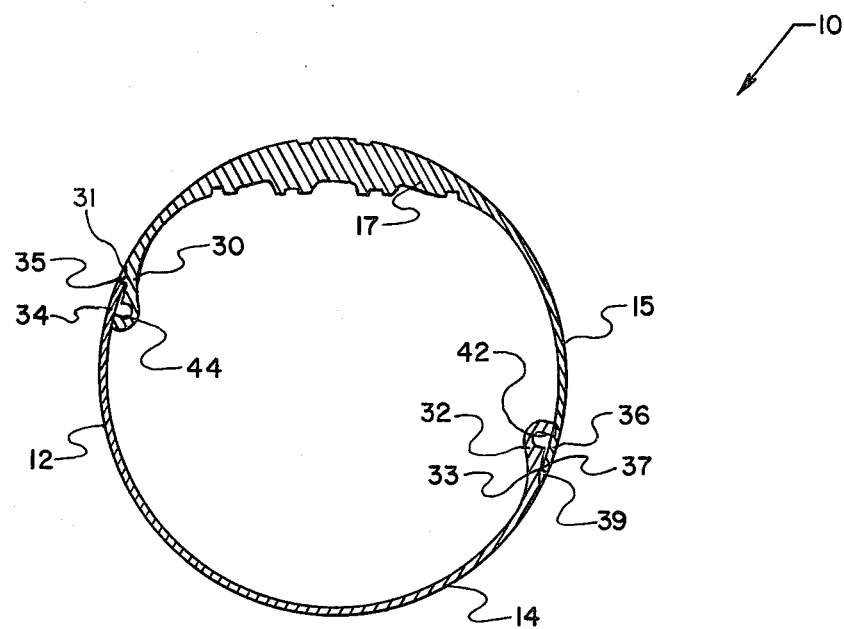
FIG. 2 is a cross-sectional view taken along line 2—2 of FIG. 1.

As shown in FIGS. 1 and 2 the upper portion 15 is extruded with a thickened portion which provides a "strongback" strengthening that portion of the cargo area which supports the weight of the carrier and its cargo. The strongback section 17 is shown drilled and tapped at 19 to provide means for attachment to an aircraft external cargo rack. Also included in the extrusion of each of the top and bottom sections is a thickened portion shown at 30 and 32 on one longitudinal edge and a thinned and tapered portion shown at 34, 36 along the other longitudinal edge. Each of the thickened portions 30, 32, are formed with a groove 42, 44 the purpose of which will be later discussed.

Each of the edges 34, 36 are of a curvature the radius of which is shorter than the general radius of curvature of the main portions so that when the two portions are fit together as shown in FIG. 2 there will be a tendency for the two sections to grip together. The thickened portions 30, 32 are relieved at 31, 33 and the other longitudinal edge is tapered at 35, 37 so that when the two sections are assembled a V-shaped groove will be provided for a continuous welding seam 39. During assembly an explosive cord is placed in channel 42, 44 and preferably takes the form of a linear shaped charge.

When the cargo section is delivered by an aircraft, the linear shaped charge is fired a short time after the dispenser leaves the aircraft. Unfortunately, the detonation of most shaped charge devices having a sufficient power to cut the skin of the dispenser will produce a flash of visible light in so doing. In fact, some of the arrangements tested produced sufficient light to illuminate the aircraft during delivery.

In accordance with the present invention, therefore, a chemical flash suppressant 50 is placed along the container in line with the shaped charged device 52. The chemical 50 is contained in a plastic tube 54 and held in place by a metal strip 56. The metal strip 56 may be fastened by any conventional means to the cargo dispenser and in this case is shown fastened by a plurality of screws 58.

Figure 3:
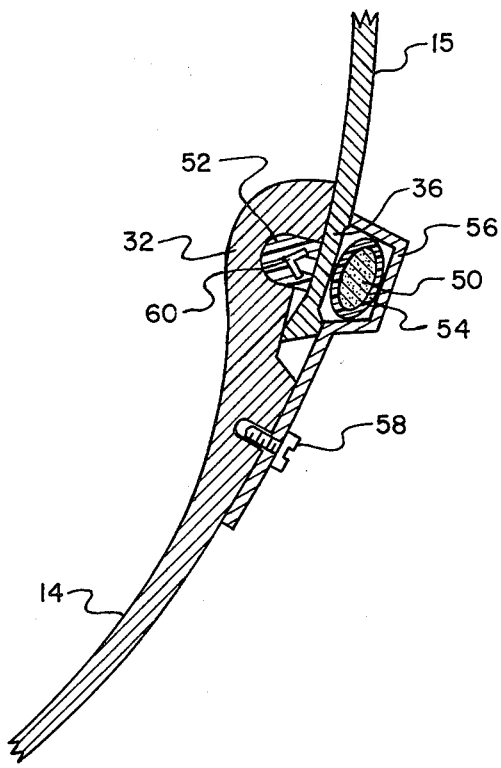
FIG. 3 is an enlarged detail cross-sectional view of a portion of FIG. 2.
Figure 4:
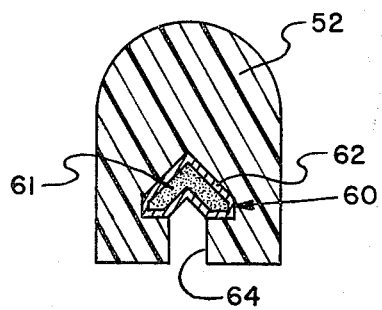
FIG. 4 is a detailed cross-sectional view of the linear shaped charge in FIG. 3.

A conventional shaped charge device used in the FIG. 3 device is shown in enlarged section in FIG. 4. The protective sheath 52 of synthetic plastic material is chambered to receive the linear shaped charge device 60. A shaped charge device consists generally of an explosive material 61 in the shape of an inverted V surrounded by a metal sheath 62. The chamber in plastic sheath 62 is situated such that the shaped charge device 60 is placed at an optimun standoff distance from the surface of attachment determined by the thickness of the plastic sheath at 64.

Figure 5:
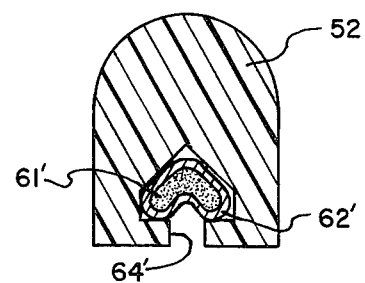
FIG. 5 is a detailed cross-sectional view of an alternate linear shaped charge.

A preferred embodiment of the linear shaped charge assembly for flash suppression is illustrated in FIG. 5. The plastic sheath 62 comprises a conventional bore containing the linear shaped charge device which comprises a conventional explosive material 61' but which is surrounded by the unconventional metal sheath 62' consisting of silver. With the use of a silver metal sheath or liner, the optimum standoff is found to be shorter as shown at 64'.

Initial investigation of the source of light during weapon delivery indicated that the primary source of light output was encountered when the aluminum sheath LSC cut the aluminum skin of the container. Light output incident to the detonation of the linear shaped charge alone was secondary and light output from the explosive without the aluminum sheath was negligible when compared to other sources of light. Results of the tests are shown in Table I.

TABLE I

| Material | Light Intensity-Footcandles | | Light Duration-Milliseconds | |
|---|---|---|---|---|
| | Reflected | Direct | ½-pulse | Full Pulse |
| 1) Detonator alone | .44 | 65.9 | .7 | 3.4 |

TABLE I-continued

| Material | Light Intensity-Footcandles | | Light Duration-Milliseconds | |
|---|---|---|---|---|
| | Reflected | Direct | ½-pulse | Full Pulse |
| 2) Det + PBXN 301* | 25.4 | 3806.2 | 2.8 | 7.1 |
| 3) Det + Comp C-4** | 2.6 | 389.6 | 1.6 | 3.6 |
| 4) Det + Al. LSC Assy. | 27.5 | 4120.9 | 1.0 | 5.7 |
| 5) Det + LSC + ⅛-in Al. Plate | 609.4 | 91,318.6 | 1.8 | 10.8 |

**RDX 91%; Polyisobutylene 2.10%; Motor oil 1.60%; Di-(2-Ethylhexyl) sebocate 5.30%; by weight.
*PETN 80%; Silicone resin 20%, by weight.

Variations in light intensity and duration between similar test units were encountered. Because of this variation, a number of samples of both the bare aluminum LSC assembly and the LSC plus the ⅛-inch-thick (approximately 3.16 mm) thick 6061-T6 aluminum plate were tested. These additional tests were performed in order to determine the standard deviation, range and mean to facilitate statistical comparison. One standard deviation of the bare LSC samples was 9.6 footcandles reflected. One standard deviation of the LSC cutting the aluminum plate was 153 footcandles reflected.

A second series of tests was performed to investigate alternative jacketing of the LSC explosive with materials other than aluminum, changing the explosive material and measuring the light output of the LSC alone or cutting a ⅛-inch shaped aluminum plate.

The various alternate LSC sheathing types and the test setup used are listed below:

a. Copper LSC, 20 grains of CH-6[1] per foot (Approximately 42 cg/dm)

[1]. 97.5% RDX, 1.5% Calcium Stearate; 0.5% graphite; 0.5% polyisobutylene.

b. Copper LSC cutting a ⅛-inch-thick aluminum plate (Approximately 3.16 mm)
c. Silver LSC, 15 grains of Dipam[2] per foot (Approximately 31.5 cg/dm)

[2]. 3,3-diamino-2,2',4,4',6,6' hexanitrobiphenyl d. Silver LSC, 15 grains of Dipam per foot, cutting a ⅛-inch-thick aluminum plate
e. Silver LSC, 25 grains of HNS[3] per foot (Approximately 52.5 cg/dm), cutting a ⅛-inch-thick aluminum plate

[3]. Hexanitrostilbene f. Lead LSC, 20 grains of HNS per foot
g. Lead LSC, 20 grains of HNS per foot, cutting a ⅛-inch-thick aluminum plate Results of these tests are given in Table 2:

TABLE 2

| Material | Light Measurements of Various LSC Materials | | | | Remarks |
|---|---|---|---|---|---|
| | Light Intensity Footcandles | | Duration Milliseconds | | |
| | Reflected | Direct | ½-Pulse | Full Pulse | |
| 1) Cu LSC + Det | .6 | 90 | .8 | 3.7 | Much fragment damage to instrumentation; 20 samples |
| 2) Cu LSC + Det + ⅛ alum. plate | 7.3 | 1095 | 1.4 | 4.9 | 3 samples of 20 failed to cut completely through |
| 3) Ag LSC + Det | .4 | 60 | .75 | 5.3 | 3 samples; LSC was available in a limited supply |
| 4) Ag LSC + Det + ⅛ alum. plate | .3 | 45 | No Records | No Records | 3 samples |
| 5) Ag LSC + Det + ⅛ alum. plate | 1.1 | — | — (believed to be low) | — | obscure because of instrumentation anomalies |
| 6) Pb LSC + Det | .97 | 145 | 1.4 | 4.0 | Broad pulse instead of sharp spike like previous tests; 3 samples —limited supply |
| 7) Pb LSC + Det | 25.7 | 3855 | 6.2 | 14.0 | |

All three alternate sheathing types appeared significantly better from a low light output standpoint than the aluminum-sheathed LSC. All samples, except the 25 grains/ft silver LSC, failed to produce the desired cutting action as seen in the previous aluminum LSC tests and are considered unacceptable, or at most marginally acceptable, in their present form. The ⅛-thick aluminum plates were cut part way through in most instances, and then the blast tore the remaining thickness. The silver material with the 15 grains/ft explosive appeared to be as good at cutting as the copper or lead with 20 grains/ft explosive, and the light output was much lower. The light output in the series of copper-sheathed LSC tests appeared to be dependent on whether the aluminum plate was cut cleanly through at some points along the cutting line. The more complete the cutting action, the greater was the light output.

Test involving the other suppressing means and the results obtained are listed in Table 3

TABLE 3

Screening Tests

| Test Condition | Light Output in Footcandles Reflected |
|---|---|
| 1- Aluminum-sheathed LSC cutting ⅛-inch-thick aluminum plate with external skin additions | |
| (a) Asbestos paper | No measured reduction |
| (b) RTV ⅛-inch-thick | No measured reduction |
| (c) 1/16-inch-thick brass | 22 to 33 |
| (d) 1/16-inch-thick steel | 30.5 |
| (e) Clear plastic 1/16-inch-thick | No measured reduction |
| (f) Bakelite 1/16-inch-thick | No measured reduction |
| (g) Glass epoxy circuit board 1/16-inch-thick | No measured reduction |
| (h) Rubber 1/16-inch-thick | No measured reduction |
| (i) Caulking Compound ⅛-inch-thick | 42.8 |
| (j) Epoxy ⅛-inch-thick | No measured reduction |
| (k) Overlapping 1/16-inch-thick steel light trap | No measured reduction |
| (l) Tar-cork | No measured reduction |
| (m) Grease ⅛-inch-thick coating | 55 |
| (n) Potassium sulfate ⅛-inch-thick | Slight reduction |
| (o) Lead foil 1/16-inch-thick | No measured reduction |
| 2- Aluminum-sheathed LSC cutting 1/16-inch thick steel | 1200 |
| 3- Aluminum-sheathed LSC cutting 1/16-inch thick brass | No measured reduction |
| 4- Copper-sheathed LSC cutting 1/16-inch-thick aluminum | 13.4 |
| 5- Aluminum-sheathed LSC cutting ⅛-inch-thick aluminum plate with plastic electrical insulation tube filled with various substances as follows: | |
| (a) Calcium sulfate | 36.2 |
| (b) Potassium sulfate | 15.4 |
| (c) Borax | 13.8 |
| (d) Potassium chloride | 13.6 |
| (e) Solder flux containing zinc cloride | 5.2 |
| (f) Sodium chloride | 3.8 |
| (g) Sodium bicarbonate | 3.4 |
| (h) Potassium chloride-filled tube with steel holder | 2.4 |
| (i) Aluminum oxide | 1.6 |
| (j) Grease | 0 |
| (k) Sodium Chloride | 0 |
| (l) Xerox toner | 5 (secondary flash) |
| (m) Graphite | 17 |
| (n) Acrylamide-water mix | 6.7 |
| (o) Sodium nitrate | 45 |
| (p) Ammonium oxalate | 22.8 |
| (q) Calcium fluoride | 8.5 |
| (r) Plastic tube with no fill | No measured reduction |

From the foregoing it can be seen that considerable reduction in the flash can be achieved when cutting open the container with a linear shaped charge by using a shaped charge jacket other than aluminum and by adding a chemical flash suppressent externally of the container along the cutting line.

What is claimed is:

1. In an aerial delivery cargo dispenser comprising a hollow aluminum shell and a shaped charge device within said shell positioned to cut open said shell, the improvement comprising:
    a tubular plastic container fastened externally of said shell in line with and substantially coextensive with the shaped charge device; and
    a visible light flash suppressant in said container consisting essentially of a salt selected from the group consisting of sodium chloride, sodium bicarbonate, aluminum oxide, calcium fluoride and potossium chloride.

2. The combination according to claim 1 further including:
    said shaped charge device consisting of an explosive material confined in a metal sheath; and
    said sheath being of a metal selected from the group consisting of lead, copper and silver.

3. The combination according to claim 1 wherein said chemical suppressant consists essentially of sodium chloride.

4. The combination according to claim 3 further including:
    a shaped charge device consisting of an explosive material confined in a metal sheath; and
    said sheath being a metal selected from the group consisting of lead, copper and silver.

5. The combination according to claim 1 further including:
    said linear shaped charge device consisting of an explosive material confined in a metal sheath of substantially pure silver.

6. The combination of claim 3 further including:
    said linear shaped charge device consisting of an explosive material confined in a metal sheath consisting essentially of silver.

* * * * *